United States Patent
Mantynen

(10) Patent No.: US 9,432,841 B2
(45) Date of Patent: Aug. 30, 2016

(54) TECHNIQUE FOR HLR ADDRESS ALLOCATION IN A UDC NETWORK

(75) Inventor: Mika Mantynen, Budapest (HU)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 53 days.

(21) Appl. No.: 14/371,479

(22) PCT Filed: Jan. 10, 2012

(86) PCT No.: PCT/EP2012/000079
§ 371 (c)(1),
(2), (4) Date: Jul. 10, 2014

(87) PCT Pub. No.: WO2013/104371
PCT Pub. Date: Jul. 18, 2013

(65) Prior Publication Data
US 2014/0378130 A1 Dec. 25, 2014

(51) Int. Cl.
*H04W 8/26* (2009.01)
*H04W 8/02* (2009.01)

(52) U.S. Cl.
CPC ............... *H04W 8/26* (2013.01); *H04W 8/02* (2013.01)

(58) Field of Classification Search
CPC ......... H04W 8/04; H04W 8/12; H04W 8/26; H04W 8/02
See application file for complete search history.

(56) References Cited

U.S. PATENT DOCUMENTS

| | | | | |
|---|---|---|---|---|
| 6,950,876 | B2 * | 9/2005 | Bright et al. | 709/230 |
| 7,366,945 | B2 * | 4/2008 | Wang et al. | 714/4.11 |
| 2001/0034231 | A1 * | 10/2001 | Palat et al. | 455/433 |
| 2003/0171119 | A1 * | 9/2003 | McIntosh | 455/445 |
| 2008/0064391 | A1 * | 3/2008 | Cai et al. | 455/426.1 |
| 2009/0023444 | A1 * | 1/2009 | Inoue | 455/435.1 |
| 2010/0291924 | A1 * | 11/2010 | Antrim et al. | 455/433 |

FOREIGN PATENT DOCUMENTS

WO 2009135924 A2 11/2009

OTHER PUBLICATIONS

"Digital cellular telecommunications system (Phase 2+); Universal Mobile Telecommunications System (UMTS); Mobile Application Part (MAP) specification (3GPP TS 29.002 version 10.4.0 Release 10)", Technical Specification, 3GPP GSM, ETSI TS 129 002 V10.4.0 (Oct. 2011), 955 pages.

(Continued)

*Primary Examiner* — Nathan Mitchell
(74) *Attorney, Agent, or Firm* — Patents on Demand P.A.; Brian K. Buchheit; Scott M. Garrett

(57) ABSTRACT

A technique for allocating Home Location Register (HLR) addresses in a network in which HLR subscription data is stored in a central data repository for access by multiple HLR entities is presented. A method implementation of the technique comprises allocating, to an HLR entity, two or more virtual HLR addresses, wherein each virtual HLR address is associated with an individual set of subscriber identifiers for which HLR subscription data is stored in the central data repository.

30 Claims, 6 Drawing Sheets

(56) References Cited

OTHER PUBLICATIONS

"3rd Generation Partnership Project; Technical Specification Group Core Network and Terminals; Restoration procedures (Release 10)", 3GPP Standard; 3GPP TS 23.007, 3rd Generation Partnership Projects (3GPP), Mobile Competence Centre; 650, Route Des Lucioles; F-06921 Sophia-Antipolis Cedex, France, vol. CT WG 4, No. V10.6.0, Dec. 16, 2011, pp. 1-55, XP050554537.

"3rd Generation Partnership Project; Technical Specification Group Core Network and Terminals; User Data Convergence (UDC); Technical realization and information flows; Stage 2 (Release 10)", 3GPP Standard; 3GPP TS 23.335, 3rd Generation Partnership Project (3GPP), Mobile Competence Centre; 650, Route Des Lucioles; F-06921 Sophia-Antipolis Cedex, France, No. V10.0.0, Apr. 4, 2011, pp. 1-39, XP050476918.

\* cited by examiner

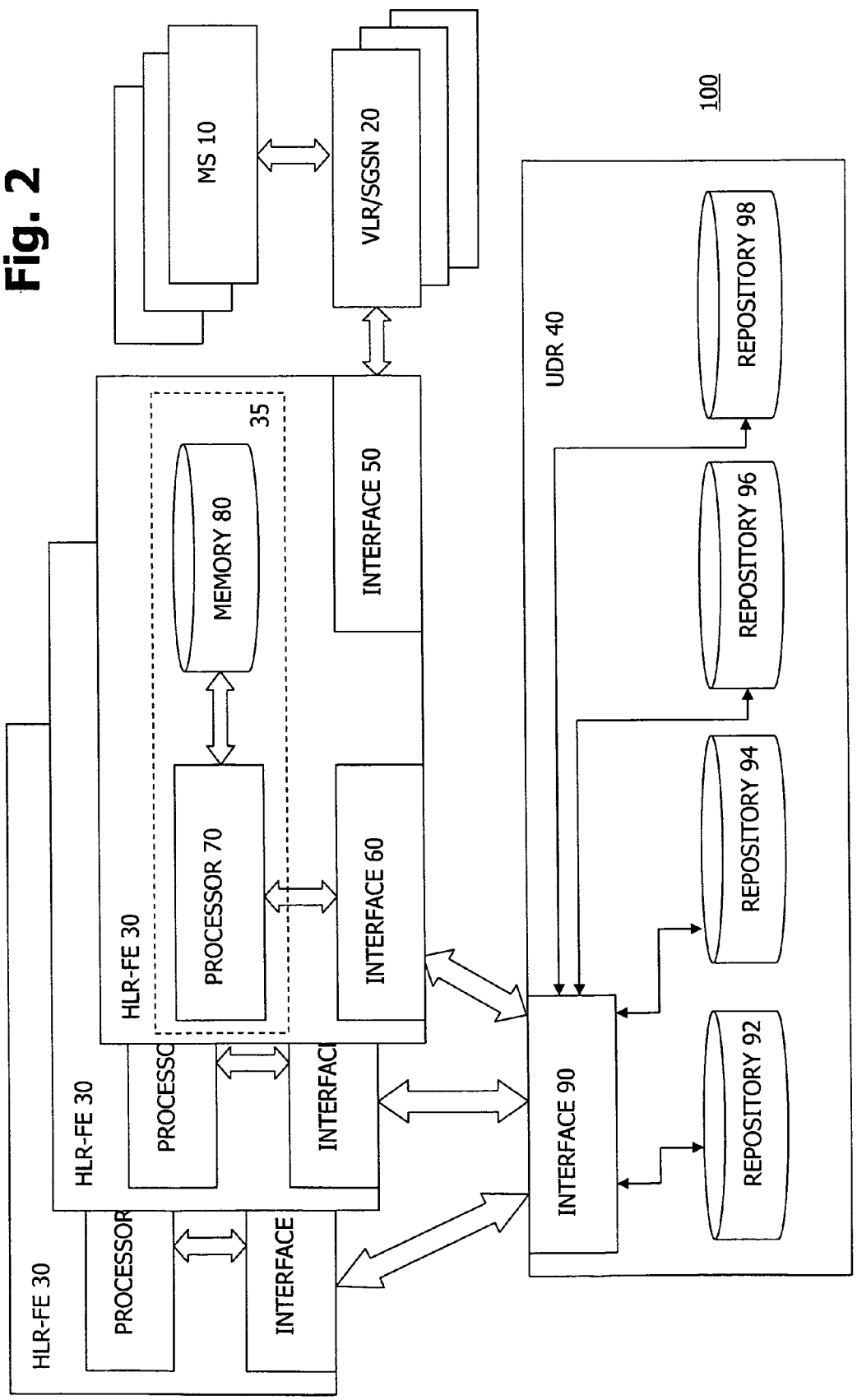

TECHNIQUE FOR HLR ADDRESS ALLOCATION IN A UDC NETWORK

CROSS-REFERENCE TO RELATED APPLICATION

This application is a 35 U.S.C. §371 National Phase Entry Application from PCT/EP2012/000079, filed Jan. 10, 2012, and designating the United States.

TECHNICAL FIELD

The present disclosure generally relates to allocation of Home Location Register (HLR) addresses. In particular, an HLR address allocation technique in a User Data Convergence (UDC) or similar network is presented.

BACKGROUND

UDC networks support a layered architecture that separates user data from application logic. In a UDC network, the user data are stored centrally in a logically unique entity called User Data Repository (UDR). An exemplary realisation of a UDC network with a UDR is described in $3^{rd}$ Generation Partnership Project (3GPP) Technical Specification (TS) 23.335 V.9.0.0 (2010-03).

In TS 23.335, the entities that need to access user data stored in the UDR are collectively referred to as application Front Ends (FEs). The application FEs keep the application logic for handling the user data retrieved from the UDR and connect to the UDR through a so-called Ud reference point. Examples of application FEs include the HLR, Home Subscriber Server (HSS), Access Network Discovery and Selection Function in Home Network (H-ANDSF), Application Servers (ASs), and so on.

Compared to a non-UDC network, in a UDC network the capacity of an individual HLR (i.e., of an HLR-FE) is drastically increased. The capacity increase results from the fact that the HLR-FE can be realized as a dataless entity (as the subscription data are stored centrally in the UDR, see FIG. 1). An HLR-FE will thus be in charge of handling a significantly larger number of subscriptions than a conventional HLR in a non-UDC network. However, the capacity increase also has certain drawbacks, and such draw-backs exist in particular in case of an outage of, for example, the UDR.

In case of an outage of a conventional HLR, the recovery process is defined in 3GPP TS 23.007. Specifically, the HLR is to send a reset message to each Visitor Location Register (VLR) in which one of its subscribers is registered. This message causes each concerned VLR to mark the relevant subscriber record by "Location Information Not Confirmed in HLR". The marking triggers, upon an activity of the related subscriber, a location update procedure towards the HLR so as to update VLR subscription information (via Insert Subscriber Data messages) and the VLR address stored by the HLR. A similar recovery process is defined for the interface between the HLR and an associated Serving GPRS Support Node (SGSN).

As will be appreciated, the reset message sent by the HLR after an outage triggers a burst of Location Update messages towards the HLR (and a subsequent burst of Insert Subscriber Data messages to the VLR/SGSN). While in conventional networks such message bursts could be handled, the HLR capacity increase in UDC networks is expected to result in unacceptably high peak loads for HLR-FEs and the UDR. To address this drawback the reset messages could be sent one-by-one by the HLR-FE, but then the recovery time would increase to an extent that the nightly maintenance window may not be long enough to facilitate the corrective Location Update procedures.

SUMMARY

Accordingly, there is a need to provide a technique that permits a better control of a recovery procedure in a UDC or similar network in which HLR subscription data is stored in a central data repository.

According to one aspect, a method of allocating HLR addresses in a network in which HLR subscription data is stored in a central data repository for access by multiple HLR entities is provided, wherein the method comprises allocating, to an HLR entity, two or more virtual HLR addresses, wherein each virtual HLR address is associated with an individual set of subscriber identifiers for which HLR subscription data is stored in the central data repository.

The method may be performed by the HLR entity itself or by a device co-located with the HLR entity. Alternatively, the method may be performed by a device located remotely from the HLR entity. As an example, the method may be performed by a central allocation device in charge of allocating virtual HLR addresses to sets of HLR entities. In cases in which the method comprises multiple steps, the steps may be performed by a single such component or in a distributed manner by multiple such components.

In one implementation at least one reset message is sent by the HLR entity to which the two or more virtual HLR addresses have been allocated. The reset message may comprise at least one of the virtual HLR addresses allocated to the HLR entity. In certain implementations, a sequence of two or more reset messages may be sent, wherein the reset messages comprise different virtual HLR addresses allocated to the HLR entity. The reset messages included in the message sequence may be sent at spaced apart points in time.

Sending of the at least one reset message may be triggered by one or more dedicated events. As an example, at least of a Man Machine Language (MML) command and a command received via a Man Machine Interface (MMI) may serve as a triggering event. The command may specify one or more virtual HLR addresses for which the at least one reset message is to be sent.

The command and/or the reset message may be generated in different scenarios, including outages (e.g., physical resets) in the UDC network, the need of updating HLR subscription data in a VLR or SGSN, or the need for an update of VLR or SGSN addresses in HLR entities (e.g., after HLR migration). As an example, the at least one reset message may be sent in connection with migration or recovery from an outage of at least one of the HLR entity (or a portion thereof) and the central data repository (or a portion thereof).

The central data repository may be organised to comprise multiple repository entities, such as individual hardware entities, databases, and so on. There may exist a defined relationship between the repository entities on the one hand and the sets of subscriber identifiers on the other. As an example, the relationship may be defined such that upon recovery from an outage (or in similar situations requiring an address update), at most one reset message has to be sent per HLR entity. In one realization, an individual repository entity stores the HLR subscription data of exactly one set of subscriber identifiers. For different HLR entities in the network, different virtual HLR addresses may be associated with the same set of subscriber identifiers. In one realization of this approach, the virtual HLR addresses may be unique among the HLR entities (e.g., to a avoid address conflicts).

In one variant, the method may comprise receiving a first message comprising a subscriber identifier, determining the virtual HLR address associated with the subscriber identifier thus received, and responding to the first message with a second message comprising the virtual HLR address thus determined. In an exemplary 3GPP implementation, the second message may be a TC-CONTINUE message.

In another variant, the method may comprise receiving a first message comprising a subscriber identifier, querying the central data repository for data based on the subscriber identifier thus received, and responding to the first message with a second message comprising the queried data. The two variants discussed above may be combined as needed. For example, the receiving step may trigger the remaining execution of both variants at a time.

The central data repository may be queried for HLR subscription data (optionally including authentication data) associated with the subscriber identifier. As such, the first message in both variants may be one of a location update message and an authentication request message.

The individual set of subscriber identifiers may comprise a range of consecutive subscriber identifiers or multiple such ranges. The subscriber identifiers may help to identify a specific subscription for which HLR subscription data is stored in the central data repository. As an example, the subscriber identifiers may be International Mobile Subscriber Identities (IMSIs) or may be adapted to determine such IMSIs (such as via Mobile Global Titles, or MGTs).

The association between the virtual HLR addresses and the set of subscriber identifiers may generally be defined as a mapping. In one example, the association (e.g., the mapping) is defined in a configuration table. For an individual HLR entity, an individual configuration table may be maintained. The virtual HLR addresses allocated to the HLR entities may conform to the Signalling Connection Control Part (SCCP) specification.

According to a further aspect, a method of allocating subscriber identifiers in a network in which HLR subscription data is stored in a central data repository for access by multiple HLR entities is provided, wherein to an HLR entity two or more virtual HLR addresses are allocated, wherein each virtual HLR address is associated with an individual set of subscriber identifiers for which HLR subscription data is stored in the central repository, wherein the central data repository is organized to comprise multiple repository entities, and wherein the method comprises the step of defining an association between the repository entities and the sets of subscriber identifiers.

Also provided is a computer program product comprising program code portions for performing any of the methods and method steps presented herein when the computer program product is executed on one or more computing devices. The computer program product may be stored on a computer readable recording medium such as a CD-Rom, DVD, semiconductor memory or hard disk. The computer program product may also be provided for download via a communication network.

According to a still further aspect, a device for allocating HLR addresses in a network in which HLR subscription data is stored in a central data repository for access by multiple HLR entities is provided, wherein the device comprises a processor configured to allocate, to an HLR entity, two or more virtual HLR addresses, wherein each virtual HLR address is associated with an individual set of subscriber identifiers for which HLR subscription data is stored in the central data repository.

The device may be comprised by an HLR entity. The HLR entity may host HLR application logic and comprise an interface to the central data repository. The interface may be realized as Ud reference point in accordance with 3GPP TS 23.335.

According to another aspect, a central data repository comprising multiple repository entities and storing HLR subscription data for access by multiple HLR entities is provided, wherein to a HLR entity two or more virtual HLR addresses are allocated, wherein each virtual HLR address is associated with an individual set of subscriber identifiers for which HLR subscription data is stored in the central data repository, and wherein there exits an association between the repository entities and the sets of subscriber identifiers.

Also provided is an HLR system comprising multiple HLR entities as presented herein as well as the central data repository presented herein.

A data signal or a data structure is also provided in a network in which HLR subscription data is stored in a central data repository for access by multiple HLR entities, wherein, to an HLR entity, two or more virtual HLR addresses are allocated, wherein the data signal or data structure associates each HLR address with an individual set of subscriber identifiers for which HLR subscription data is stored in the central data repository.

BRIEF DESCRIPTION OF THE DRAWINGS

Further aspects, details and advantages of the technique presented herein will become apparent from the following description of exemplary embodiments in conjunction with the drawings, wherein:

FIG. 2 schematically illustrates a network embodiment with multiple device embodiments;

DETAILED DESCRIPTION

Figure 1:
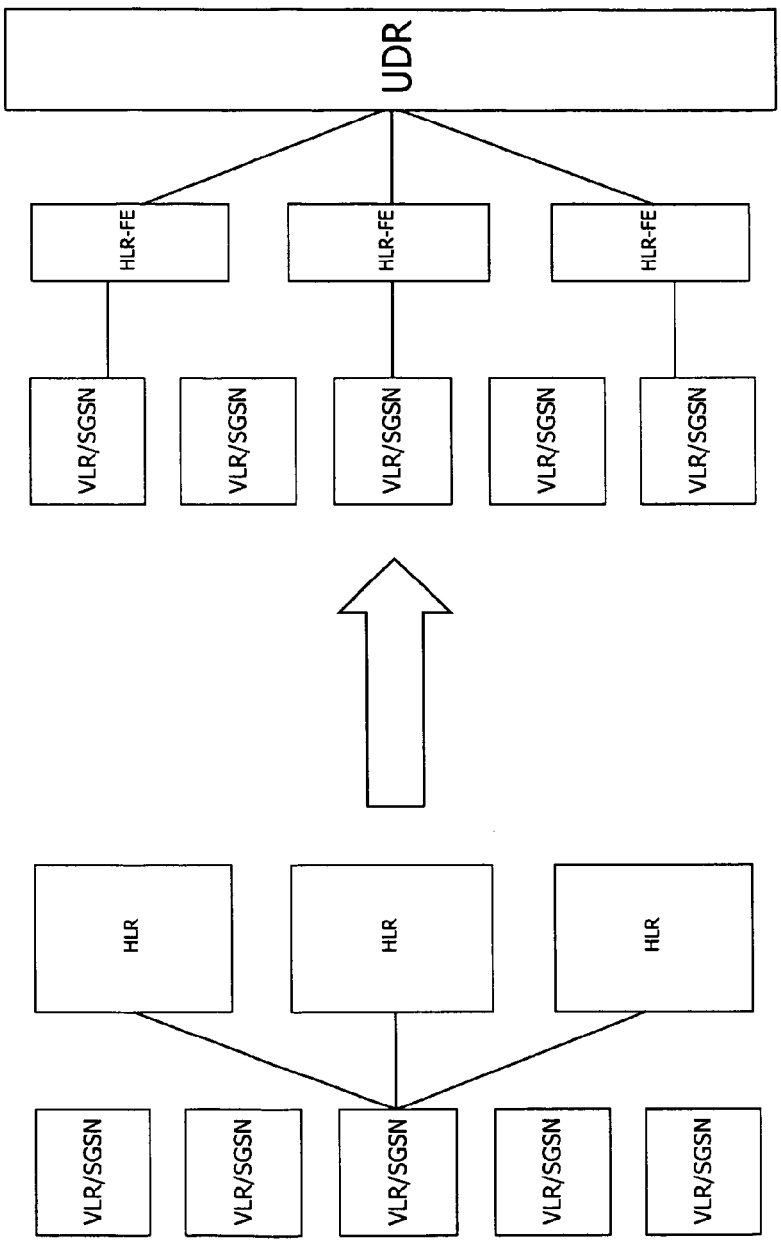
FIG. 1 illustrates a graphical comparison between a non-UDC network and a UDC network.

In the following description of exemplary embodiments, for purposes of explanation and not limitation, specific details are set forth, such as specific functions, device configurations and sequences of signalling steps, in order to provide a thorough understanding of the technique presented herein. It will be apparent to one skilled in the art that the technique may be practiced in other embodiments that depart from these specific details. For example, while the following description will exemplarily refer to a 3GPP TS 23.335 implementation, it will be apparent that the technique presented herein can generally be implemented in connection with network configurations in which HLR subscription data is stored in a central data repository for access by multiple HLR entities. That is, the technique presented herein is not limited to an implementation in a UDC network according to 3GPP TS 23.335.

Moreover, those skilled in the art will appreciate that the services, functions and steps explained herein below may be implemented using software functioning in conjunction with a programmed microprocessor, an Application Specific Integrated Circuit (ASIC), a Digital Signal Processor (DSP) or a general purpose computer. It will also be appreciated that while the following embodiments will primarily be described in the context of methods and devices, the technique presented herein may also be embodied in a computer program product as well as a system comprising a computer processor and a memory coupled to the processor, wherein the memory is encoded with one or more programs that perform the services, functions and steps disclosed herein when executed by the processor.

The technique presented herein will in the following be described in the exemplary context of a network conforming to the 3GPP specifications. The general mechanisms for restoring (e.g., recovering from) HLR, VLR and SGSN outages are defined in 3GPP TS 29.002. From the point of view of an HLR, restoration comprises the process of returning gracefully to the situation (e.g., in terms of data stored in the HLR and VLR/SGSN) that existed before HLR outage. From the point of view of a VLR, recovery refers to the restoration of the subscription data in the VLR before VLR outage (e.g., VLR reset). From the point of view of recovery, restoration a SGSN works in a very similar manner as restoration of the VLR, and therefore VLR and SGSN will largely be mentioned together in the following description, although there exist certain differences (e.g., in terms of message names and indicators). Recovery details, in particular as to the involved messaging, are defined in 3GPP TS 23.007. The following embodiments can be implemented as enhancements to both 3GPP TS 29.002 as well as 3GPP TS 23.007.

FIG. 2 illustrates an embodiment of a network 100 conforming to the 3GPP specifications. The network 100 illustrated in FIG. 2 is realized as a UDC network having a layered architecture as defined in 3GPP TS 23.335. It should be noted that in FIG. 2 only the network components helpful for understanding the technique presented herein are illustrated. In other words, the network 100 will in practice comprise further components not illustrated in FIG. 2.

As shown in FIG. 2 the UDC network 100 comprises multiple Mobile Stations (MSs) 10, multiple VLRs/SGSNs 20, multiple HLR entities in the form of HLR-FEs 30, as well as a central data repository in the form of a UDR 40. The UDR 40 stores HLR subscription data for access by the multiple HLR-FEs 30.

Each individual HLR-FE 30 comprises one or more interfaces 50 to the VLRs/SGSNs 20 as well as a dedicated interface 60 to the UDR 40. The interface 50 of the HLR-FE 30, or another interface not shown in FIG. 2, may be configured to receive one or both of MML commands and MMI commands. In the present 3GPP implementation, the interface 60 is realized as Ud reference point.

The HLR-FE 30 further comprises an allocation device 35 with a processor 70 and a memory 80. The memory 80, or another memory of the HLR-FE 30, may host HLR application logic according to the 3GPP specifications. The processor 70 is configured to allocate, to the HLR entity 30, two or more virtual addresses, wherein each virtual HLR address is associated with an individual set of subscriber identifiers for which HLR subscription data is stored in the UDR 40. The resulting association between the virtual HLR addresses on the one hand and the one or more sets of subscriber identifiers on the other is defined in a configuration table (not illustrated in FIG. 2). The configuration table may be stored in the memory 80.

In the embodiment illustrated in FIG. 2, each individual HLR-FE 30 is equipped with an allocation device 35. The individual allocation devices 35 of a set of HLR-FEs 30 may be configured to communicate with each other for a coordination of the allocation processes. It should be noted that in other embodiments, a single allocation device 35 may be provided for a set of HLR-FEs 30 (e.g., an HLR-FE cluster) as a centralized solution. A centralized allocation device 35 or a communication among local allocation devices 35 can help to avoid address conflicts as will be described in greater details below.

Still referring to FIG. 2, the UDR 40 comprises an interface 90 for communication with the plurality of HLR-FEs 30. In a similar manner as the interface 60 of the HLR-FE 30, the interface 90 of the UDR 40 is realized as Ud reference point in accordance with 3GPP TS 23.335. The UDR 40 further comprises a plurality of repository entities 92, 94, 96, 98.

Each repository entity 92, 94, 96, 98 is configured as a separate hardware entity (e.g., in the form of a separate computer unit with an associated data base). The HLR subscription data is therefore stored in a distributed manner in the multiple repository entities 92, 94, 96, 98 of the UDR 40. As will be described below in more detail, there exists an association between the repository entities 92, 94, 96, 98 on the one hand and the sets of subscriber identifiers (each one being associated with a virtual HLR address) on the other. In one implementation, each individual repository entity 92, 94, 96, 98 may store the HLR subscription data of exactly one set of subscriber identifiers, but other embodiments may be depart from such an implementation.

Figures 3, 4:
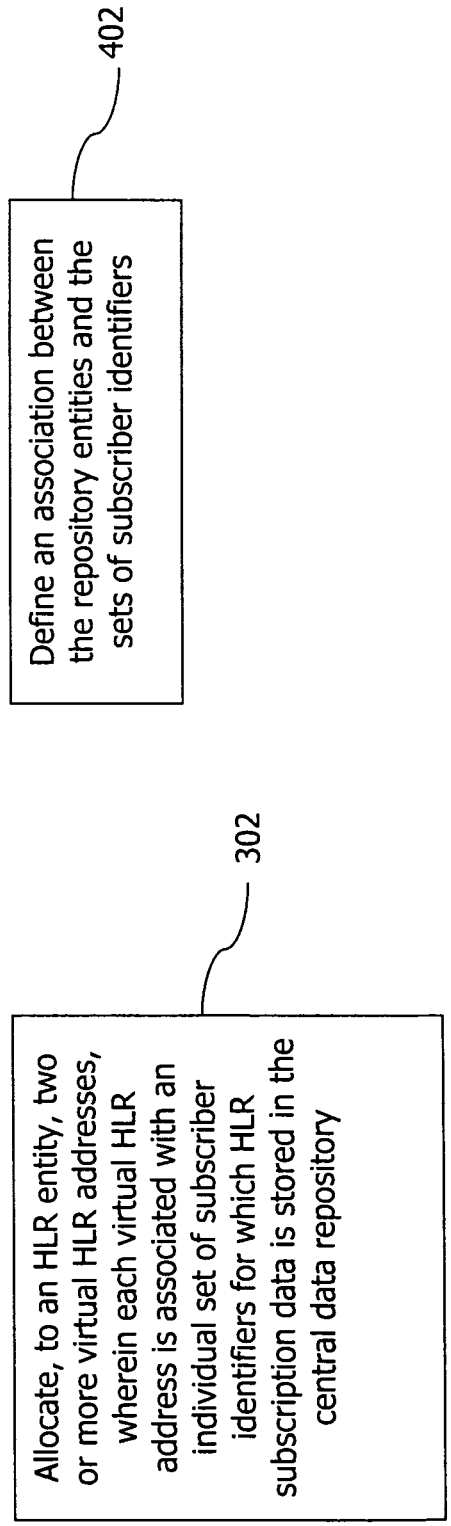
FIGS. 3 and 4 schematically illustrate the steps comprised by two method embodiments.
Figure 5:
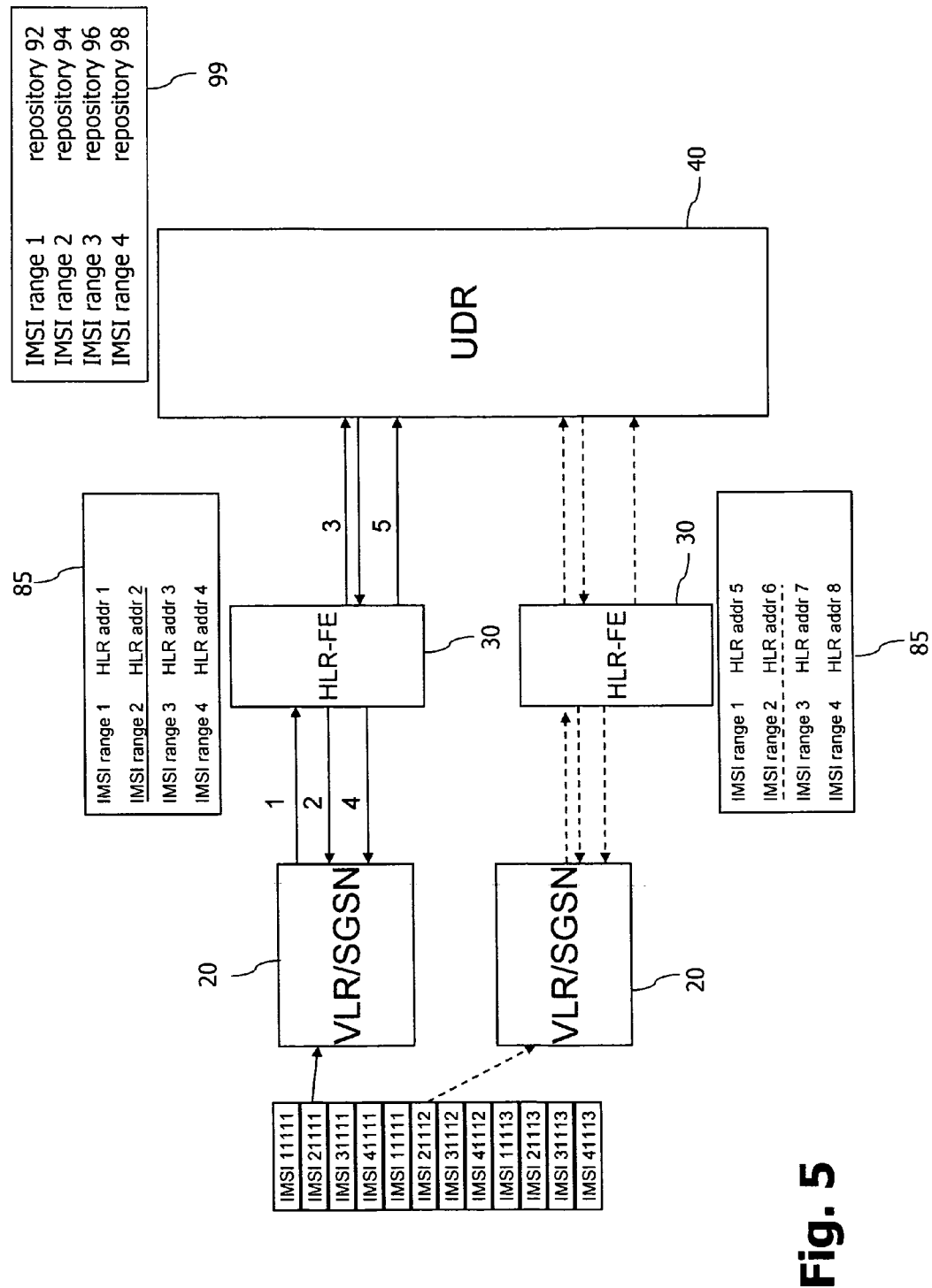
FIG. 5 is a schematic block diagram illustrating the operation of the network of FIG. 1 in connection with a location update or authentication procedure.

In order to become operative, both the HLR-FEs 30 as well as the UDR 40 have to be appropriately configured. With reference to FIGS. 3, 4 and 5, the configuration process will now be described in more detail.

The configuration of the HLR-FEs 30 comprises the allocation of two or more virtual HLR addresses per HLR-FE 30. The corresponding allocation step 302 as shown in is FIG. 3 is performed by the processor 70 of the allocation device 35. Specifically, the processor 70 allocates the multiple virtual HLR addresses to a given HLR-FE 30 such that each virtual HLR address is associated with an individual set of subscriber identifiers for which HLR subscription data is stored in the UDR 40. In the present 3GPP implementation, the subscriber identifiers may take the form of IMSIs.

The resulting association between sets of subscriber identifiers and virtual HLR addresses allocated to an individual HLR-FE 30 is defined as a mapping. The mapping is stored in a configuration table 85 as shown in FIG. 5. In the embodiment illustrated in FIG. 5, each set of subscriber identifiers is defined to comprise a range of consecutive IMSIs. Specifically, for each HLR-FE 30 four IMSI ranges are defined, and each IMSI range is mapped in the configuration table 85 to an individual virtual HLR address per HLR-FE 30.

As can also be gathered from the two exemplary configuration tables 85 shown in FIG. 5, the allocation of virtual HLR addresses among multiple HLR-FEs 30 is performed such that conflicts among the virtual HLR addresses can be avoided. That is, different HRL-FEs 30 are associated with different virtual HLR addresses (i.e., virtual HLR addresses may at least locally be unique within a cluster of HLR FEs 30). As also becomes apparent from the two configuration tables 85, different HLR-FEs 30 map the same IMSI range to different virtual HLR addresses. For example, IMSI range 1 is mapped to virtual HLR addresses 1 for a first HLR-FE 30, and to another HLR address 5 for a second HLR-FE 30.

By means of the virtual HLR addresses, each physical HLR-FE 30 is divided into multiple logical HLR-FEs. Each logical HLR-FE is uniquely associated with one virtual HLR address. The virtual HLR addresses may have the appearance of conventional HLR addresses (e.g., may conform to the SCCP specification). As will be appreciated, each logical HLR-FE will be in charge of fewer subscriptions (i.e., fewer MSs 10) than a "regular" HLR-FE, to which a single (physical) HLR address would be associated.

With reference to FIGS. 2, 4 and 5, there not only exists an association between sets of subscriber identifiers and virtual HLR addresses, but also an association between sets of subscriber identifiers and the repository entities 92, 94, 96, 98 of the UDR 40. The corresponding association may be defined either by the allocation device 35 or an internal processor (not shown) of the UDR 40 in an associating step 402 (see FIG. 4). The association may take the form of a mapping. The mapping may be stored in is the form of an optional configuration table 99 in an internal memory (not shown) of the UDR 40 or otherwise.

With reference to FIG. 5, the configuration table 99 may uniquely assign an individual IMSI range defined for the HLR-FEs 30 to a single one of the repositories 92, 94, 96, 98. As stated above, the corresponding definition step 402 illustrated in FIG. 4 may be performed by either the processor 70 (in particular in cases in which the allocation device 35 is realized as a central network component) or by a local processor of the UDR 40.

Once the UDC network 100 has been configured as discussed above (i.e., once the configuration tables 85 for the HLR-FEs 30 and the configuration table 99 for the UDR 40 have been defined), the UDC network 100 is ready for regular operation as will now be described in greater detail. Regular operation may involve resolving subscriber identifiers as received from the VLRs/SGSNs 20 based on the configuration table 85 and responding with the associated virtual HLR address. Regular operation may also comprise querying the UDR 40 for data based on a subscriber identifier received from the VLRs/SGSNs 20 and responding with the queried data. Those processes will, for example, occur in the context of location updates and fetching of authentication data.

When an MS 10 associated with a particular subscription for which HLR subscription data is stored in the UDR 40 performs its first location update via a VLR/SGSN 20 to an HLR-FE 30, the HLR-FE 30 is selected according to the IMSI as presently defined in the 3GPP specifications (see IMSI list on the left hand side of FIG. 5). The selected HLR-FE 30 responds to the location update with a virtual HLR address in the calling-party-address field of a TC-CONTINUE message as described in 3GPP TS 29.002. The HLR-FE 30 derives the virtual HLR address for the given IMSI from its configuration table 85. As a result of the location update, the VLR/SGSN 20 stores a virtual ("logical") HLR address (at least for home subscribers) instead of a conventional ("physical") HLR address.

Subsequent transactions from the VLR/SGSN 20 will use the virtual HLR address, and transactions (not illustrated in FIG. 5) from a Gateway Mobile Switching Centre (GMSC) or a Short Message Service Centre (SMSC) the one received as a result of IMSI analysis. The GMSC may send Send Routing Information (SRI) as part of a mobile terminating call establishment procedure. The SMSC (or the GMSC) may send SRI for an SMS as part of a mobile terminating SMS delivery procedure. These entities (GMSC and SMSC), however, do not store the (virtual) HLR address in the subscriber repository and, consequently, SRI does not contain the IMSI.

It will be appreciated that the location update procedure from the VLR and the SGSN are independent for each other. That is, VLR and SGSN may access subscription data pertaining to the same MS 10/subscriber via a different HLR-FEs 30, and may hence receive different virtual HLR addresses. On the other hand, if the VLR and the SGSN select the same HLR-FE 30, the same virtual HLR address will be returned (since the same IMSI is resolved using the same configuration table 85).

In the following, the location update procedure will be described in more detail with reference to arrows denoted 1 to 5 in FIG. 5 as well as the corresponding signalling diagram in FIG. 6.

Initially, an MS 10 associated with a particular subscription performs a first location update procedure with respect to a given VLR/SGSN 20. In the present embodiment it will be assumed that the corresponding subscription is associated with IMSI 21111.

Figure 6:
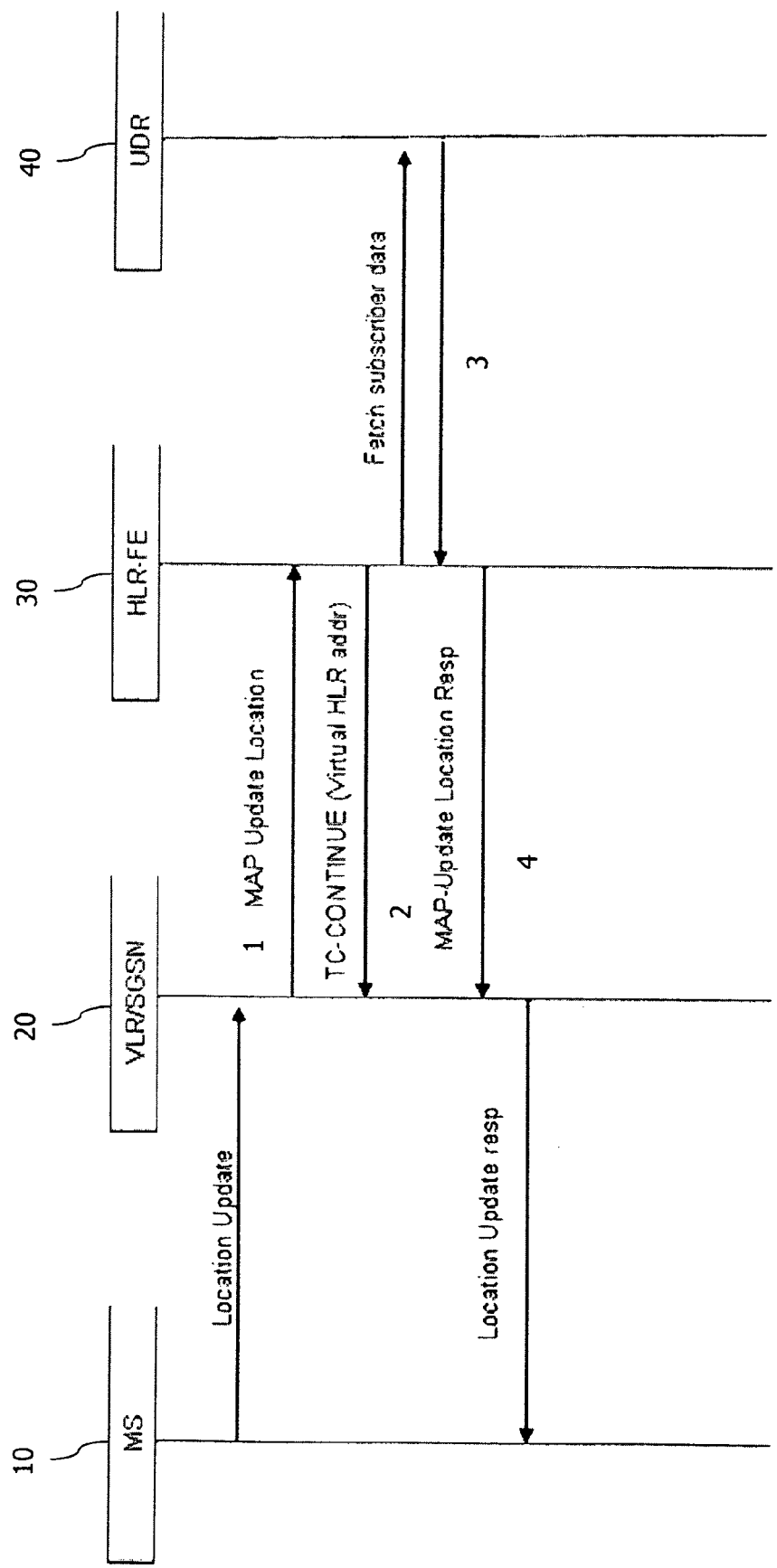
FIG. 6 illustrates a signalling diagram of a location update procedure.

In a first step indicated by arrow 1 in FIGS. 5 and 6, the VLR/SGSN 20 sends a MAP_UPDATE(_GPRS)_LOCATION message to the HLR-FE 30. In this regard, the VLR/SGSN 20 uses the E.214 Mobile Global Title (MGT) originally derived by the VLR/SGSN 20 from the IMSI according to 3GPP TS 29.002. With reference to 3GPP TS 29.002, when the MS 10 registers for the first time in the VLR/SGSN 20, the VLR/SGSN 20 has to initiate the update location dialogue with the HLR (here the HLR-FE 30) associated with the MS 10 and a preceding dialogue for authentication information retrieval (in cases in which the authentication information has to be retrieved from the HLR). When initiating either of these dialogues, the only data for addressing the HLR available to the VLR/SGSN 20 is typically contained in the IMSI, and addressing information for SCCP may be derived therefrom.

When continuing an established update location dialogue (as with any other dialogue), the VLR/SGSN 20 may derive the routing information towards the HLR from the Calling Party Address received with the first responding CONTINUE message until a dialogue terminating message is received. In this regard the VLR/SGSN 20 should generally be able to address the HLR based on the E.214 MGT originally derived by the VLR/SGSN 20 from the IMSI or an E.212 number originally derived from the IMSI, an E.164 HLR address, or, in the case of intra-Public Land Mobile Network (PLMN) signalling, a Signalling Point Code (SPC). When answering with MGT to the VLR/SGSN 20, the HLR may insert its E.164 address in the Calling Party Address of the SCCP message containing the first responding CONTINUE message.

The IMSI comes as an Information Element (IE) in the MAP message. As for the addressing of the MAP message, in SCCP an E.214 address may be used. The addressing selection is made by the VLR/SGSN 20, not the HLR-FE 30. The HLR-FE 30 is the one that then returns in the present embodiments the virtual HLR address. Specifically, upon receipt of the MAP message and the subscriber identifier (IMSI) included therein, the HLR-FE 30 consults its configuration table 85 to determine the associated virtual HLR address. The virtual HLR address thus determined is sent back to the VLR/SGSN 20 in a TC-CONTINUE message as illustrated by arrow 2.

Additionally, the HLR-FE 30 queries the UDR 40 for the subscription data associated with the IMSI received from the VLR/SGSN 20. To this end a corresponding query message including the IMSI is sent to the UDR 40. The queried subscription data is then retrieved from one of the repository entities 92, 94, 96, 98 and forwarded to the HLR-FE 30 as indicated by arrow 3. In this regard, the table 99 or other mechanisms may be utilized to determine the particular repository entity storing the queried subscription data.

Upon receipt of the queried data from the UDR 40, the HLR-FE 30 sends the subscription data thus obtained to the VLR/SGSN 20 with one or more Insert Subscriber Data messages as indicated by arrow 4. Responsive to receipt of the one or more Insert Subscriber Data messages the VLR/SGSN 20 sends a Location Update response message to the MS 10 as shown in FIG. 6.

In a further step indicated by arrow 5 in FIG. 5, the HLR-FE 30 updates the VLR/SGSN address (as received from the VLR/SGSN 20 in a conventional manner) in the associated subscription data in the UDR 40.

A similar communication between the entities of the UDC network as illustrated in FIG. 5 may occur earlier in the context of fetching authentication data when the MS 10 triggers a first location update process in an associated VLR/SGSN 20. In such a case, the VLR/SGSN 20 will send a MAP_SEND_AUTHENTICATION_INFO message to the HLR-FE 30 using the E.214 Mobile Global Title (as originally derived by the VLR/SGSN from the IMSI according to 3GPP TS 29.002) in accordance with arrow 1. Then, the HLR-FE 30 looks up the respective virtual HLR address in its configuration table 85 and uses the address thus looked up for the TC-CONTINUE message it returns to the VLR/SGSN 20 (arrow 2).

The HLR-FE 30 or an associated Authentication Center (AUC) in a next step queries the required authentication data (as included in the associated subscription data) from the UDR 40 (arrow 3). The AUC stores the authentication keys for the individual subscriptions. HLR-FE 30 and AUC may be co-located (e.g., implemented using common hardware resources) and may communicate with each other via a dedicated interface. In a final step, the HLR-FE 30 sends the authentication data received from the UDR 40 to the VLR/SGSN 20 with a MAP_SEND_AUTHENTICATION_INFO message.

In the preceding description the embodiment has been described with respect to the regular operation of the components of the UDC network 100. In the following, exceptional operational modes will be described with reference to FIG. 7.

Figure 7:
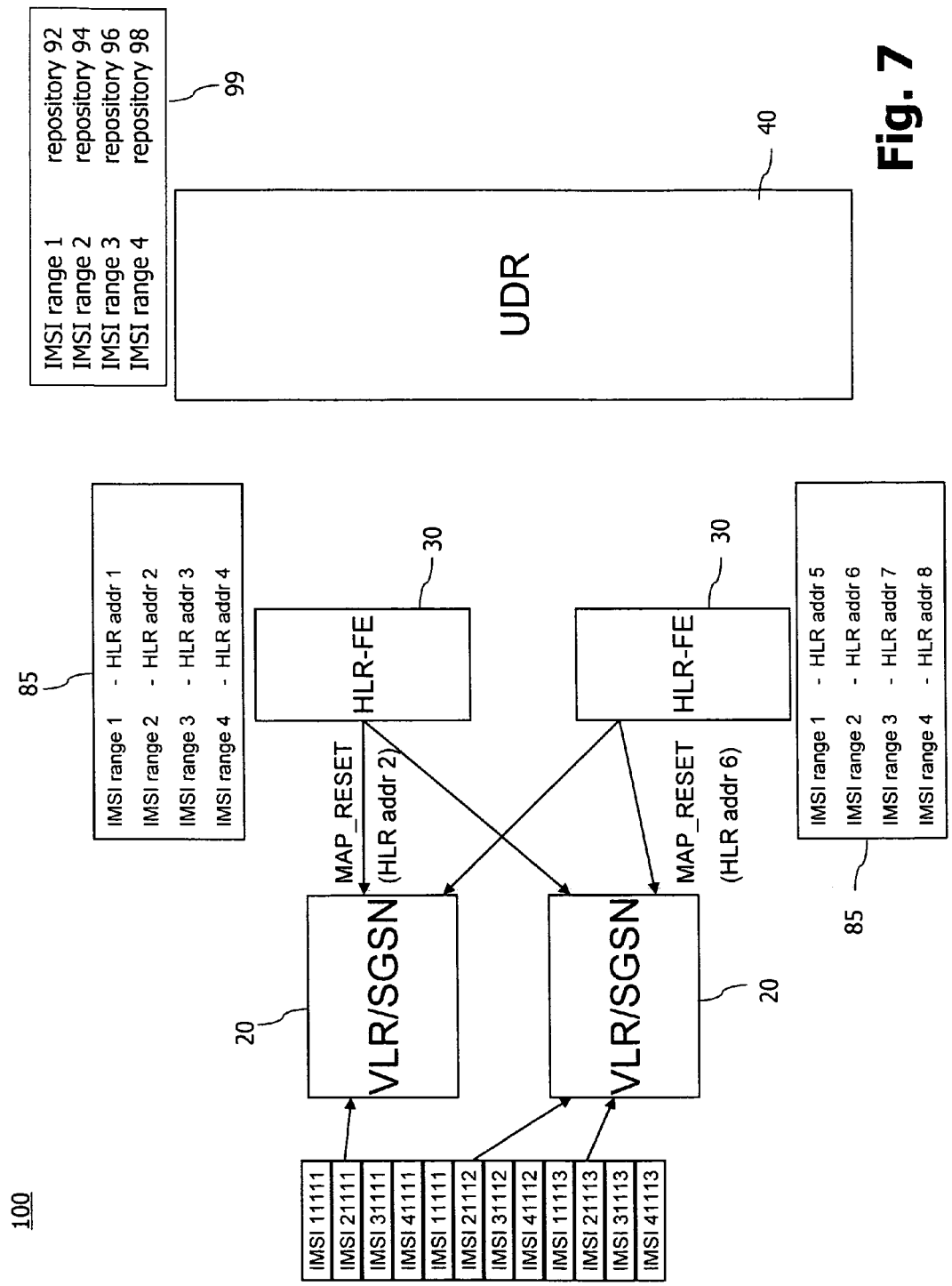
FIG. 7 is a schematic block diagram illustrating the transmission of reset messages in the network of FIG. 1.

Exceptional operational modes may involve migration or recovery from an outage of the HRL-FE 30 and/or the UDR 40. As an example, an individual repository entity 92, 94, 96, 98 of the UDR 40 may have had an outage that required its physical reset (and associated update of subscription data). The update of subscription data in the VLR/SGSN 20, or an update of VLR/SGSN addresses in the HLR-FE 30 or the UDR 40, might also be needed in the case of a migration scenario. In such and other exceptional operational modes it might be required to send reset messages from the concerned HLR-FEs 30 to the VLRs/SGSNs 20 as illustrated in FIG. 7. In the present exemplary 3GPP implementation, the reset messages may be MAP_RESET messages in accordance with 3GPP TS 23.007.

Generation and transmission of reset messages by one or more HLR-FEs 30 is triggered by an MMI or MML command input via the associated interface of the HLR-FEs 30. The corresponding command may specify one or more virtual HLR addresses and/or sets of subscriber identifiers. If, for example, the repository entity 94 associated with IMSI range 2 has recovered from an outage, the MML or MMI commands responsive to recovery from that outage specifies IMSI range 2 or the associated virtual HLR address. The MML/MMI command is executed by all HLR-FEs 30 in the UDC network 100, which send an associated reset message to all connected VLRs/SGSNs 20. Since, as stated above, different HLR-FEs 30 have associated different virtual HLR addresses to the same set of subscriber identifiers (here: IMSI range 2), the reset message sent by different HLR-FEs 30 will contain different virtual HLR addresses (e.g., virtual HLR address 2 and virtual HLR address 6 in the embodiment depicted in FIG. 7).

As will be appreciated, the logical division of a single HLR-FE 30 into multiple logical HLR-FEs by use of virtual HLR addresses reduces the amount of reset messages (and resulting feedback messages) sent in the UDC network 100. As such, the network load in the UDC network 100 can be reduced. Also, a partial recovery of the UDR 40 (e.g., of one or more of its repository entities 92, 94, 96, 98) becomes possible, and the load on the UDR 40 and the HLR-FE 30 will be reduced. The reduced load is associated with the fact that reset messages sent to the VLRs/SGSNs 20 will address fewer MSs 10 than in conventional scenarios.

It will also be appreciated that in cases in which a single HLR-FE 30 has to send multiple reset messages (e.g., because multiple repository entities 92, 94, 96, 98 of the UDR 40 were effected by an outage), the corresponding reset messages may be sent at space apart points in time by an individual HLR-FE 30. In this way the resulting processing load may more evenly be distributed over time for the HLR-FE 30 and the UDR 40.

It is believed that many advantages of the technique disclosed herein will be fully understood from the foregoing description, and it will apparent that various charges may be made in the form, construction and arrangement of the exemplary embodiments without departing from the scope of the invention, or without sacrificing all of its advantages. As the technique presented herein can be varied in many ways, it will recognized that the invention should be limited only be scope of the claims that follow.

The invention claimed is:

1. A method of allocating Home Location Register (HLR) addresses in a network in which HLR subscription data is stored in a central data repository for access by multiple HLR entities, the method comprising:
   mapping a first virtual HLR address with a first set of subscriber identifiers, wherein, for each subscriber identifier included in the first set of subscriber identifiers, HLR subscription data is stored in the central data repository;
   mapping a second virtual HLR address with a second set of subscriber identifiers, wherein, for each subscriber identifier included in the second set of subscriber identifiers, HLR subscription data is stored in the central data repository;
   allocating, to an HLR entity, the first virtual HLR address, and
   allocating, to said HLR entity, the second virtual HLR address.

2. The method of claim 1, further comprising:
   sending, by the HLR entity, at least one reset message comprising a virtual HLR address allocated to the HLR entity.

3. The method of claim 2, further comprising sending a sequence of two or more reset messages, wherein the reset messages comprise different virtual HLR addresses allocated to the HLR entity.

4. The method of claim 3, wherein the reset messages are sent at spaced apart points in time.

5. The method of claim 2, wherein sending of the at least one reset message is triggered by at least one of a Man Machine Language, MML, command and a command received via a Man Machine Interface, or MMI.

6. The method of claim 5, wherein the command specifies one or more virtual HLR addresses for which the at least one reset message is to be sent.

7. The method of claim 2, wherein the at least one reset message is sent in connection with migration or recovery from an outage of at least one of the HLR entity or a portion thereof and the central data repository or a portion thereof.

8. The method of claim 1, wherein the central data repository is organized to comprise multiple repository entities, wherein there exists an association between the repository entities and the sets of subscriber identifiers.

9. The method of claim 7, wherein the relationship is defined such that upon migration and recovery from an outage at most one reset message has to be sent per HLR entity.

10. The method of claim 8, wherein an individual repository entity stores the HLR subscription data of exactly one set of subscriber identifiers.

11. The method of claim 1, wherein
the first set of subscriber identifiers and the second set of subscriber identifiers are disjoint such that said sets have no subscriber identifier in common, and
for different HLR entities in the network, different virtual HLR addresses are associated with the same set of subscriber identifiers.

12. The method of claim 1, further comprising:
receiving a first message comprising a subscriber identifier;
determining the virtual HLR address associated with the subscriber identifier thus received; and
responding to the first message with a second message comprising the virtual HLR address thus determined.

13. The method of claim 12, wherein the second message is a TC-CONTINUE message.

14. The method of claim 1, further comprising:
receiving a first message comprising a subscriber identifier;
querying the central data repository for data based on the subscriber identifier thus received; and
responding to the first message with a second message comprising the queried data.

15. The method of claim 14, wherein the central data repository is queried for HLR subscription data, optionally including authentication data, associated with the subscriber identifier.

16. The method of claim 12, wherein the first message is one of a location update message and an authentication request message.

17. The method of claim 1, wherein the individual set of subscriber identifiers comprises a range of consecutive subscriber identifiers.

18. The method of claim 1, wherein the subscriber identifiers are International Mobile Subscriber Identities, or IMSIs.

19. The method of claim 1, wherein the association between the virtual HLR addresses and the one or more sets of subscriber identifiers is defined in a configuration table.

20. The method of claim 1, wherein the virtual HLR addresses conform to the Signaling Connection Control Part, or SCCP, specification.

21. A method of allocating subscriber identifiers in a network in which Home Location Register (HLR) subscription data is stored in a central data repository for access by multiple HLR entities, the method comprising:
organizing the central data repository such that the central data repository comprises a plurality of separate and distinct repository entities, including a first repository entity comprising a first database and a second repository entity comprising a second database that is separate and distinct from the first database;
mapping a first set of subscriber identifiers to the first repository entity; and
mapping a second set of subscriber identifiers to the second repository entity, wherein
for each subscriber identifier included in the first set of subscriber identifiers, HLR subscription data is stored in the first repository entity,
for each subscriber identifier included in the second set of subscriber identifiers, HLR subscription data is stored in the second repository entity
a first virtual HLR address is allocated to an HLR entity,
a second virtual HLR address is allocated to said HLR entity,
the first virtual HLR address is associated with said first set of subscriber identifiers, and
the second virtual HLR address is associated with said second set of subscriber identifiers.

22. A computer program product comprising program code portions for performing the method of claim 1 when executed on one or more computing devices.

23. The computer program product of claim 22, stored on a computer readable recording medium.

24. A device for allocating Home Location Register (HRL) addresses in a network in which HLR subscription data is stored in a central data repository for access by multiple HLR entities, the device comprising:
a memory; and
a processor coupled to the memory, wherein the processor is configured to allocate, to an HLR entity, a first virtual HLR address and a second virtual HLR address, wherein
the first virtual HLR address is mapped to a first set of subscriber identifiers,
the first virtual HLR address is mapped to a second set of subscriber identifiers, and
for each subscriber identifier included in the first or second set of subscriber identifiers, HLR subscription data is stored in the central data repository.

25. An HLR entity comprising the device of claim 24.

26. The HLR entity of claim 25, hosting HLR application logic and comprising an interface to the central data repository.

27. The HLR entity of claim 26, wherein the interface is realized as Ud reference point in accordance with 3GPP TS 23.335.

28. A central data repository, comprising:
a first repository entity comprising a first database; and
a second repository entity comprising a second database that is separate and distinct from the first database, wherein
for each subscriber identifier included in a first set of subscriber identifiers, the first repository entity stores subscriber information associated with the subscriber identifier, for each subscriber identifier included in a second set of subscriber identifiers, the second repository entity stores subscriber information associated with the subscriber identifier, the first set of subscriber identifiers is mapped to a first virtual Home Location Register (HLR) address allocated to a first HLR entity, the second set of subscriber identifiers is mapped to a second virtual HLR address allocated to said first HLR entity, and the central data repository further comprises an interface for receiving data from and transmitting data to said first HLR entity.

29. An HLR system comprising multiple HLR entities according to claim 25 and a central data repository.

30. A system comprising:
a first Home Location Register (HLR) entity comprising an interface, a processor and a memory;
a second Home Location Register (HLR) entity comprising an interface, a processor and a memory; and
a central data repository comprising: an interface; a memory; a first repository entity comprising a first database; and a second repository entity comprising a second database that is separate and distinct from the first database, wherein a first virtual HLR address and a second virtual HLR address are allocated to the first HLR entity, a third virtual HLR address and a fourth virtual HLR address are allocated to the second HLR entity, the memory of the first HLR entity stores information mapping the first virtual HLR address with a first set of subscriber identifiers and mapping the second virtual HLR address with a second set of subscriber identifiers, the memory of the second HLR entity stores information mapping the third virtual HLR address with said first set of subscriber identifiers and mapping the fourth virtual HLR address with said second set of subscriber identifiers, and the memory of the central data repository stores information mapping the first set of subscriber identifiers with the first repository entity and mapping the second set of subscriber identifiers with the second repository entity.

* * * * *